United States Patent
Schemmann et al.

(12) 
(10) Patent No.: US 6,271,944 B1
(45) Date of Patent: Aug. 7, 2001

(54) LASER WAVELENGTH CONTROL IN AN OPTICAL COMMUNICATION SYSTEM

(75) Inventors: Marcel F. C. Schemmann, Echt (NL); Venkatesh G. Mutalik, Manlius, NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/343,906

(22) Filed: Jun. 30, 1999

(51) Int. Cl.$^7$ .......................... H04B 10/00; H04B 10/08
(52) U.S. Cl. ............................ 359/124; 359/110
(58) Field of Search ..................... 359/110, 124

(56) References Cited

U.S. PATENT DOCUMENTS

| | | | |
|---|---|---|---|
| 5,225,922 | * | 7/1993 | Chraplyvy ............... 359/124 |
| 5,548,434 | * | 8/1996 | Shimonaka ............... 359/161 |
| 5,654,816 | * | 8/1997 | Fishman ................. 359/177 |
| 5,790,289 | * | 8/1998 | Taga ..................... 359/124 |
| 5,801,860 | * | 9/1998 | Yoneyama ............... 359/124 |
| 5,920,414 | * | 6/1999 | Myachi .................. 359/133 |
| 5,995,256 | * | 11/1999 | Fee ...................... 359/125 |

FOREIGN PATENT DOCUMENTS

| | | | |
|---|---|---|---|
| 19734957C | 12/1998 | (DE) | ............ G05D/25/02 |
| 0798882A2 | 10/1997 | (EP) | ............ H04B/10/145 |
| 0862291A2 | 9/1998 | (EP) | ............ H04J/14/02 |
| 0862291A3 | 9/1998 | (EP) | ............ H04J/14/02 |
| 3-46839 | * 2/1991 | (JP) | ............ H04B/10/10 |
| 9933200A1 | 7/1999 | (WO) | ............ H04B/10/12 |
| WO 99/33200 | * 7/1999 | (WO) | ............ H04B/10/12 |

* cited by examiner

*Primary Examiner*—Leslie Pascal
*Assistant Examiner*—Agustin Bello
(74) *Attorney, Agent, or Firm*—Daniel J. Piotrowski

(57) ABSTRACT

A method and apparatus for controlling and stabilizing laser wavelengths in a dense wavelength division multiplexer (DWDM) transmission system. The lasers in the transmission system are each modulated in a known manner by a data signal. In addition, the lasers are each modulated by a plurality of test signals each having a predetermined frequency. At the optical receiver, a frequency analyzer examiners the frequency test signals for distortions and/or changes in amplitude. Any distortions and/or changes in amplitude of the frequency test signals indicate a change in the wavelength of a corresponding laser. A control signal may be returned to the laser controller of each laser to regulate the laser wavelength. A fault signal may be generated indicating that the wavelength of a laser has changed, drifted, etc., more an acceptable amount.

25 Claims, 2 Drawing Sheets

LASER WAVELENGTH CONTROL IN AN OPTICAL COMMUNICATION SYSTEM

FIELD OF THE INVENTION

The present invention is in the field of optical communication systems. More particularly, the present invention provides a method and apparatus for controlling and stabilizing laser wavelengths in a dense wavelength division multiplexer transmission system.

BACKGROUND OF THE INVENTION

Over the past few years, the use of fiber optic networks in communication systems has increased dramatically. Such fiber optic networks are commonly employed, for example, in long distance telecommunication systems, cable television systems, and Internet cable systems. In the future, the use of fiber optic networks will become even more prevalent as a preferred medium for transferring information as the marketplace for wide-bandwidth services matures. For instance, such services may include video-on-demand, interactive television and games, image networking, and video conferencing.

As the demand for fiber optic networks increases, the development of new supporting technologies and the refinement of existing technologies is required for the implementation of the above-identified services. One key for any such fiber optic network is the ability to multiplex and demultiplex optical signals. One preferred optical device for performing such functions is a wavelength division multiplexer (WDM).

A WDM is a device with multiple optical paths, each of which exhibits a particular wavelength passband. Each passband permits passage of one or more particular wavelengths (i.e., a Achannel@) along the respective optical path, to the substantial exclusion of others. Thus, the WDM can be used to a divide multichannel optical signal into specific wavelength channels, or to combine various channels on respective optical paths into one multichannel optical signal on one optical path.

Three basic classes of WDMs are commonly used, and are classified as coarse, intermediate, and dense. Coarse WDMs are configured for dividing and combining two channels that are spaced relatively far apart, e.g., a 1310/1550 nanometers (nm) WDM used to separate wavelength channels with a 100 nm bandwidth centered around 1310 nm and 1550 nm. Intermediate WDMs are configured for dividing and combining two to three channels that are spaced closer than those of the course WDMs, e.g., a 1540/1560 nm WDM used to space two channels approximately 20 nm apart in the 1550 nm wavelength band. Lastly, and subject of the present invention, dense WDMs (also referred to as DWDMs) are configured for dividing and combining four or more channels that are very closely spaced, e.g., 32 channels having a spacing of less than 1.0 nm.

DWDM transmitters in closely spaced DWDM transmission systems require accurate wavelength setting and stabilization. In many cases, to ensure system reliability, active wavelength monitoring and stabilization techniques are used to independently stabilize each transmitter in the DWDM array. Unfortunately, previously available wavelength monitoring and stabilization techniques are often complex, expensive, difficult to implement, and have limited effectiveness.

SUMMARY OF THE INVENTION

The present invention provides a method and apparatus for controlling and stabilizing laser wavelengths in a dense wavelength division multiplexer transmission system.

The lasers in an optical communication system are each modulated in a known manner by a data signal. In addition, the present invention further modulates each laser using a plurality of test signals each having a predetermined frequency. At the optical receiver, a frequency analyzer examines the frequency test signals for distortions and/or changes in amplitude. Any distortions and/or changes in amplitude of the frequency test signals indicate a change in the wavelength of a corresponding laser. A control signal may be returned to the laser controller of each laser to regulate the laser wavelength. Alternately, a fault signal may be generated indicating that the wavelength of a laser has changed, drifted, etc., more an acceptable amount.

Generally, the present invention provides an optical communication system comprising: a plurality of optical sources each having a distinct wavelength; a system for modulating each of the optical sources with a data signal and a plurality of frequency test signals, thereby producing a plurality of optical signals; a wavelength division multiplexer (WDM) for receiving the plurality of optical signals and for outputting a multiplexed optical signal; a wavelength division demultiplexer (WDD) for receiving and separating the multiplexed optical signal into the plurality of optical signals; and a system for analyzing the frequency test signals in each optical signal to indicate a change in the wavelength of the corresponding optical source.

The present invention additionally provides an optical communication method comprising the steps of: providing a plurality of optical sources each having a distinct wavelength; modulating each of the optical sources with a data signal and a plurality of frequency test signals to produce a plurality of optical signals; converting the plurality of optical signals into a multiplexed optical signal; separating the multiplexed optical signal into the plurality of optical signals; and analyzing the frequency test signals in each optical signal to indicate a change in the wavelength of the corresponding optical source.

The present invention further provides a wavelength stabilization system comprising: a plurality of optical sources each having a distinct wavelength; a system for modulating each of the optical sources with a data signal and a plurality of frequency test signals to produce a plurality of optical signals; a system for analyzing the frequency test signals in each optical signal to indicate a change in the wavelength of the corresponding optical source, and for generating a plurality of control signals each corresponding to one of the optical signals; and a controller for regulating the wavelength of each of the optical sources based on the corresponding control signal generated by the analyzing system.

The present invention also provides a method for wavelength stabilization comprising the steps of: providing a plurality of optical sources each having a distinct wavelength; modulating each of the optical sources with a data signal and a plurality of frequency test signals to produce a plurality of optical signals; analyzing the frequency test signals in each optical signal to indicate a change in the wavelength of the corresponding optical source, and generating a control signal in response thereto; and regulating the wavelength of each of the optical sources based on the corresponding control signal generated by the analyzing system.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
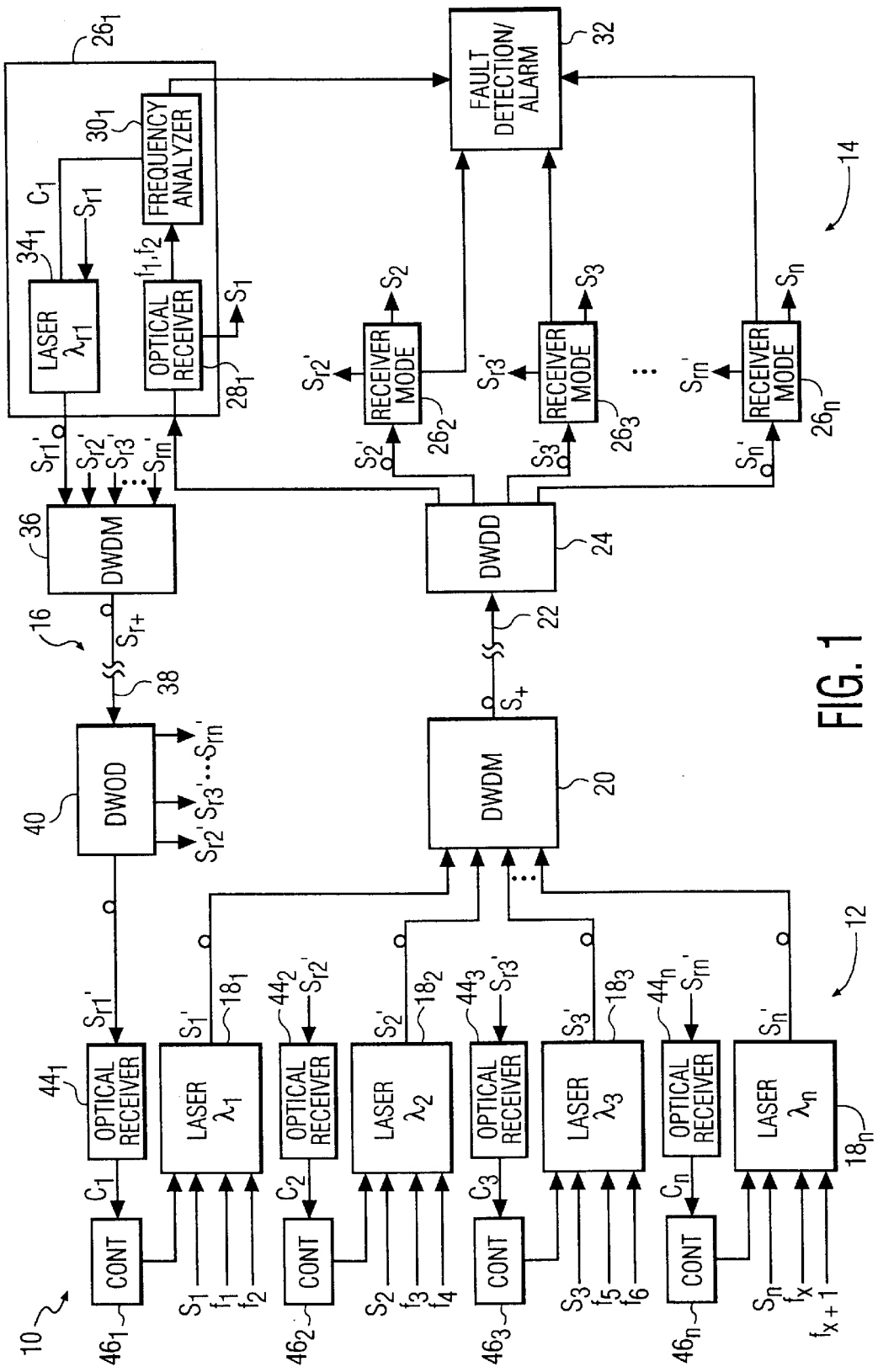
FIG. 1 illustrates an optical communication system including a wavelength stabilization system in accordance with a preferred embodiment of the present invention.

The features and advantages of the present invention are illustrated in detail in the accompanying drawings, wherein like reference numerals refer to like elements throughout the drawings. Although the drawings are intended to illustrate the present invention, the drawings are not necessarily drawn to scale.

Referring now to the figures, FIG. 1 illustrates a dense wavelength division multiplexer (DWDM) optical communication system 10 incorporating a wavelength stabilization system in accordance with a preferred embodiment of the present invention. Generally, the optical communication system 10 includes a transmission section 12, a receiving section 14, and a feedback control loop 16. Although the wavelength stabilization system of the present invention is described in conjunction with a DWDM, in which wavelength control and stabilization is important, it should be apparent to those skilled in the art that the wavelength stabilization system of the present invention may also be used to control and stabilize laser wavelengths in any type of optical communication system.

Figure 2:
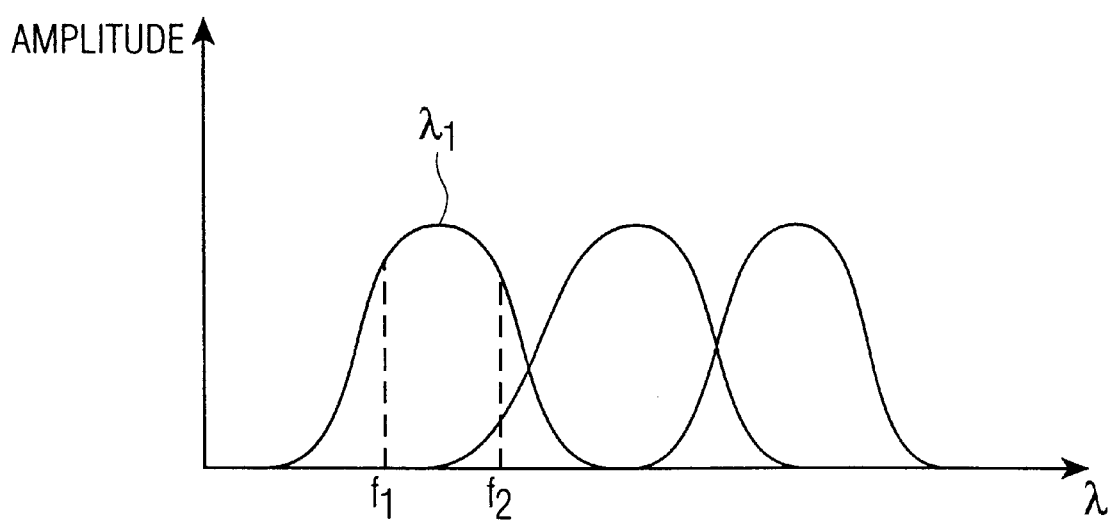
FIG. 2 illustrates a plurality of frequency test signals for a laser.

The transmission section 12 includes a plurality of lasers $18_1, 18_2, \ldots, 18_n$, each having a predefined wavelength or channel, $\lambda_1, \lambda_2, \ldots, \lambda_n$. Each of the lasers $18_1, 18_2, \ldots, 18_n$, is modulated in a manner known in the art by an electrical data signal $S_1, S_2, \ldots, S_n$, respectively. In addition, each of the lasers $18_1, 18_2, \ldots, 18_n$ is modulated by a plurality of test signals f each having a predetermined frequency. In the optical communication system 10 illustrated in FIG. 1, each of the lasers $18_1, 18_2, \ldots, 18_n$ is modulated by a pair of test signals f. Additional test signals f may also be used to modulate the lasers $18_1, 18_2, \ldots, 18_n$, without departing from the intended scope of the present invention. As shown in detail in FIG. 2, the frequency test signals f are chosen to be out of the main signal bands of the data signals $S_1, S_2, \ldots, S_n$ to prevent interference with the data signals. As illustrated in FIG. 1, the laser $18_1$ is modulated by data signal $S_1$ and first and second frequency test signals $f_1$ and $f_2$. Similarly, the lasers $18_2, 18_3, \ldots, 18_n$, are modulated by the data and frequency test signals $S_2, f_3$ and $f_4, S_3, f_5$ and $f_6, \ldots$, respectively.

The modulated optical signals $S_1', S_2', \ldots S_n'$ produced by the lasers $18_1, 18_2, \ldots, 18_n$ are then directed into an optical multiplexer 20. The modulated optical signals $S_1', S_2', \ldots, S_n'$ are combined by the optical multiplexer 20 into a transmission signal $S_t$ in a manner known in the art. The transmission signal $S_t$ is transmitted along an optical guide 22, e.g., a fiber optic cable, where it is received and demultiplexed at the receiving section 14 of the optical communication system 10. The transmission signal $S_t$ is demultiplexed by an optical demultiplexer 24 in a known manner and is separated into the modulated optical signals $S_1', S_2', \ldots, S_n'$.

In the receiver section, each individual modulated optical signal $S_1', S_2', \ldots, S_n'$ is directed into a respective receiver node $26_1, 26_2, \ldots, 26_n$. The receiver node $26_1$, is illustrated in detail in FIG. 1. The remaining receiver nodes $26_2, 26_3, \ldots, 26_n$ include similar components.

Receiver node $26_1$ includes an optical receiver $28_1$ for extracting the data signal $S_1$ and the frequency test signals $f_1$ and $f_2$ from the optical signal $S_1'$ in a known manner. In addition, the receiver node $26_1$ includes a frequency analyzer $30_1$ for examining the frequency test signals $f_1$ and $f_2$ for distortion and/or changes in amplitude.

Distortion of the frequency test signals $f_1$ and $f_2$ is preferably determined by analyzing any relative frequency changes between $f_1$ and $f_2$. For example, distortion of the frequency test signals $f_1$ and $f_2$, which indicates a change in the wavelength $\lambda_1$ of the laser $18_1$, may be determined according to $\Delta(f_1+f_2)$ or $\Delta(f_1-f_2)$. Alternately, or in addition, distortion of the frequency test signals $f_1$ and $f_2$ may be determined by examining changes in amplitude of one or both of the signals. Other techniques may also be used to determine distortion of the frequency test signals $f_1$ and $f_2$. Distortion of the frequency test signals associated with the remaining lasers $18_2, 18_3, \ldots, 18_n$, may be determined in a similar manner.

Information generated by the frequency analyzer $30_1$ may be transmitted back to the transmission section 12 via the feedback control loop 16 to control and stabilize the laser $18_1$. Alternately, the output of the frequency analyzer $30_1$ may be fed into a fault detection/alarm system 32. The fault detection/alarm system 32 may be used to detect faults (e.g., excessive wavelength drift), log such faults, generate alarms, etc., in response to output of any of the frequency analyzers $30_1, 30_2, \ldots, 30_n$. Further, part or all of the signal and/or distortion/amplitude analysis may be performed at the transmission section 12 by the controllers of the lasers $18_1, 18_2, \ldots, 18_n$ or other control system. In this case, the frequency test signals $f_1$ and $f_2$ are transmitted back (see below) to the transmission section 12 for analysis.

If the information provided by the frequency analyzer $30_1$ is to be transmitted back to the transmission section 12, the receiver node $26_1$ is provided with a return laser $34_1$. Each of the remaining receiver nodes $26_2, 26_3, \ldots, 26_n$, is also provided with a corresponding return laser $34_2, 34_3, \ldots, 34_n$. The return lasers $34_1, 34_2, \ldots, 34_n$ each have a predefined wavelength or channel, $\lambda_{r1}, \lambda_{r2}, \ldots \lambda_{rn}$, respectively. Each of the return lasers $34_1, 34_2, \ldots 34_n$ is modulated in a manner known in the art by an electrical data signal $S_{r1}, S_{r2}, \ldots, S_{rn}$, respectively. In addition, or alternately, each of the return lasers $34_1, 34_2, \ldots, 34_n$ is modulated by a control signal $C_1, C_2, \ldots, C_n$, respectively, that contains information regarding changes in the wavelengths $\lambda_1, \lambda_2, \ldots, \lambda_n$ of the lasers $18_1, 18_2, \ldots, 18_n$.

The modulated optical signals $S_{r1}', S_{r2}', \ldots, S_{rn}'$ produced by the return lasers $34_1, 34_2, \ldots, 34_n$ are then directed into an optical or electrical and optical multiplexer 36. The modulated optical signals $S_{r1}', S_{r2}', \ldots, S_{rn}'$ are combined by the optical multiplexer 36 into a transmission signal $S_{rt}$ in a manner known in the art. The transmission signal $S_{rt}$ is transmitted along an optical guide 38, e.g., a fiber optic cable, where it is received and demultiplexed at the transmission section 12 of the optical communication system 10. The transmission signal $S_{rt}$ is demultiplexed by an optical demultiplexer 40 in a known manner and is separated into the modulated optical signals $S_{r1}', S_{r2}, \ldots, S_{rn}'$.

As illustrated in detail in FIG. 1, the control signal $C_1$ is extracted from the modulated optical signal $S_{r1}'$ by an optical receiver 44$_1$. The control signal $C_1$ is subsequently fed into the controller $46_1$ of the laser $18_1$ to control and stabilize the wavelength of the laser. Similarly, the control signals $C_2, C_3, \ldots, C_1$ are fed into the corresponding controllers $46_2, 46_3, \ldots, 46_n$ of the remaining lasers $18_2, 18_3, \ldots, 18_n$.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

What is claimed is:

1. An optical communication system comprising:
    a plurality of optical sources each having a distinct wavelength;
    a system for modulating each of the optical sources with a data signal and a first and second frequency test signal, thereby producing a plurality of optical signals;
    a wavelength division multiplexer (WDM) for receiving the plurality of optical signals and for outputting a multiplexed optical signal;
    a wavelength division demultiplexer (WDD) for receiving and the multiplexed optical signal into the plurality of optical signals; and
    a system for analyzing the frequency test signals in each optical signal to indicate a change in the wavelength of the corresponding optical source.

2. The optical communication system of claim 1, wherein the analyzing system outputs a plurality of control signals each corresponding to one of the optical signals.

3. The optical communication system of claim 1, further comprising:
    a system for regulating each of the optical sources based on said plurality of control signals output by the analyzing system.

4. The optical communication system of claim 3, further including:
    a system for transmitting the plurality of control signals to the regulating system.

5. The optical communication system of claim 1, further comprising:
    a system for identifying a fault status in each of the optical sources based on said plurality of control signals output by the analyzing system.

6. The optical communication system of claim 1, wherein each frequency test signal comprises a predetermined frequency.

7. The optical communication system of claim 1, wherein the analyzing system examines the frequency test signals for distortions.

8. The optical communication system of claim 7, wherein the frequency test signals include a first frequency test signal $f_1$ and a second frequency test signal $f_2$, and wherein a distortion of the frequency test signals $f_1$ and $f_2$ is determined according to $\Delta(f_1+f_2)$ or $\Delta(f_1-f_2)$.

9. The optical communication system of claim 1, wherein the analyzing system examines the frequency test signals for changes in amplitude.

10. An optical communication method comprising the steps of:
    providing a plurality of optical sources each having a distinct wavelength;
    modulating each of the optical sources with a data signal and a first and second frequency test signal to produce a plurality of optical signals;
    converting the plurality of optical signals into a multiplexed optical signal;
    separating the multiplexed optical signal into the plurality of optical signals; and
    analyzing the frequency test signals in each optical signal to indicate a change in the wavelength of the corresponding optical source.

11. The method of claim 10, further including the step of:
    generating a plurality of control signals each corresponding to one of the optical signals.

12. The method of claim 11, further comprising the step of:
    regulating each of the optical sources based on the corresponding generated control signal.

13. The method of claim 11, further comprising the step of:
    identifying a fault status in each of the optical sources based on the corresponding generated control signal.

14. The method of claim 10, wherein each frequency test signal comprises a predetermined frequency.

15. The method of claim 10, wherein the analyzing step further comprises the step of:
    examining the frequency test signals for distortions.

16. The method of claim 15, wherein the frequency test signals include a first frequency test signal $f_1$ and a second frequency test signal $f_2$, and wherein a distortion of the frequency test signals $f_1$ and $f_2$ is determined according to $\Delta(f_1+f_2)$ or $\Delta(f_1-f_2)$.

17. The method of claim 10, wherein the analyzing step further comprises the step of:
    examining the frequency test signals for changes in amplitude.

18. A wavelength stabilization system comprising:
    a plurality of optical sources each having a distinct wavelength;
    a system for modulating each of the optical sources with a data signal and a first and second frequency test signal to produce a plurality of optical signals;
    a system for analyzing the frequency test signals in each optical signal to indicate a change in the wavelength of the corresponding optical source, and for generating a plurality of control signals each corresponding to one of the optical signals; and
    a controller for regulating the wavelength of each of the optical sources based on the corresponding control signal generated by the analyzing system.

19. The wavelength stabilization system according to claim 18, wherein the analyzing system examines the frequency test signals for distortions.

20. The wavelength stabilization system according to claim 19, wherein the frequency test signals include a first frequency test signal $f_1$ and a second frequency test signal $f_2$, and wherein a distortion of the frequency test signals $f_1$ and $f_2$ is determined according to $\Delta(f_1+f_2)$ or $\Delta(f_1-f_2)$.

21. The wavelength stabilization system according to claim 18, wherein the analyzing system examines the frequency test signals for changes in amplitude.

22. A method for wavelength stabilization comprising the steps of:
    providing a plurality of optical sources each having a distinct wavelength;
    modulating each of the optical sources with a data signal and a first and second frequency test signal to produce a plurality of optical signals;
    analyzing the frequency test signals in each optical signal to indicate a change in the wavelength of the corresponding optical source, and generating a control signal in response thereto; and regulating the wavelength of each of the optical sources based on the corresponding control signal generated by the analyzing system.

23. The method according to claim 22, further including the step of:

examining the frequency test signals for distortions.

24. The method according to claim 23, wherein the frequency test signals include a first frequency test signal $f_1$ and a second frequency test signal $f_2$, and wherein the examining step further includes the step of:

determining a distortion of the frequency test signals $f_1$ and $f_2$ according to $\Delta(f_1+f_2)$ or $\Delta(f_1-f_2)$.

25. The method according to claim 22, wherein the analyzing step further includes the step of:

examining the frequency test signals for changes in amplitude.

* * * * *